UNITED STATES PATENT OFFICE.

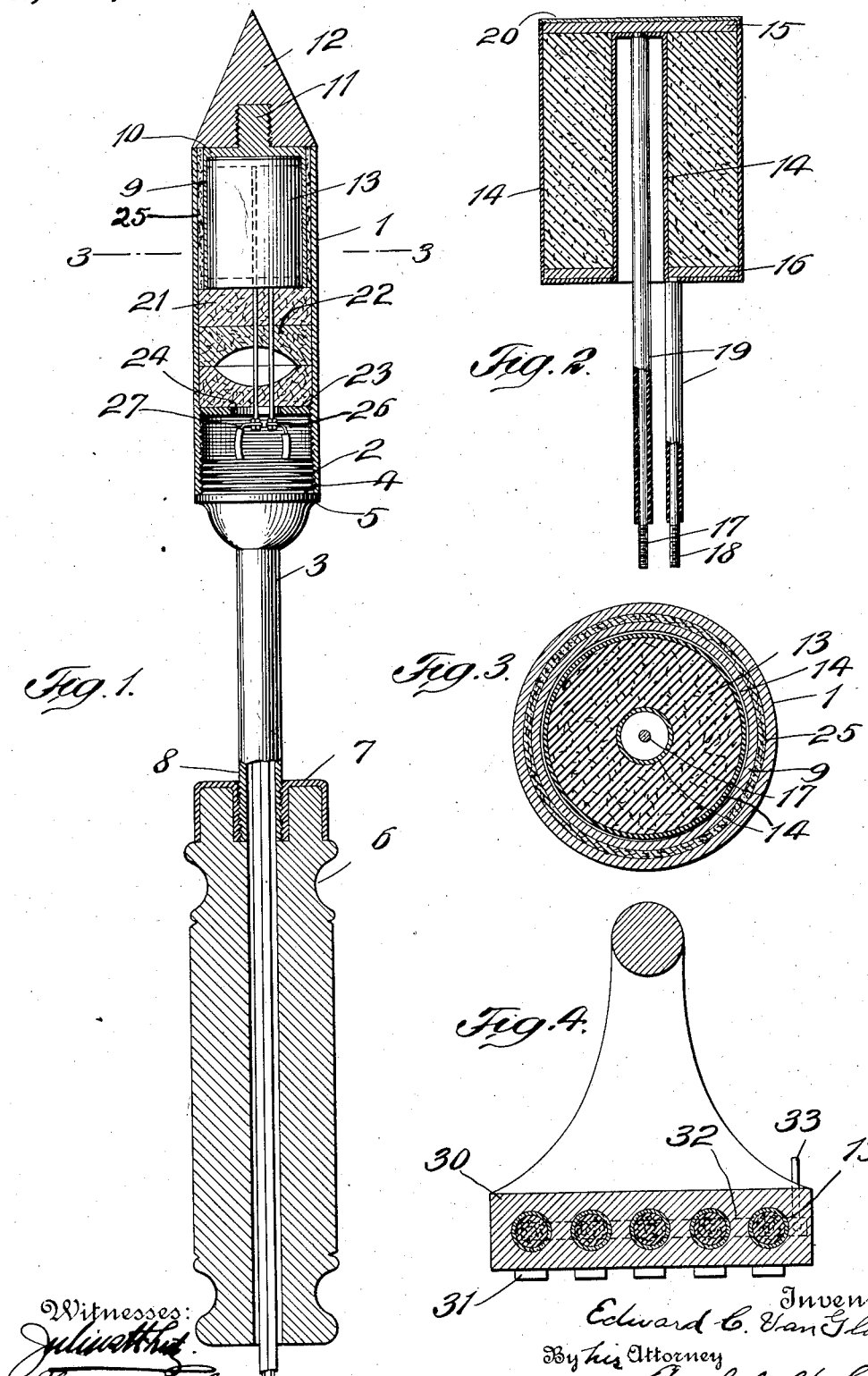

EDWARD C. VAN GLAHN, OF NEW YORK, N. Y., ASSIGNOR TO NATIONAL ELECTRIC UTILITIES CORPORATION, OF NEW YORK, N. Y., A CORPORATION OF NEW YORK.

ELECTRICALLY-HEATED IMPLEMENT.

1,096,475.  Specification of Letters Patent.  Patented May 12, 1914.

Application filed October 23, 1913. Serial No. 796,750.

*To all whom it may concern:*

Be it known that I, EDWARD C. VAN GLAHN, a citizen of the United States, residing at the city of New York, in the county and State of New York, have invented new and useful Improvements in Electrically-Heated Implements, of which the following is a specification.

This invention relates to electrically heated implements, such as soldering irons, flat irons, stove plates and the like, and it comprises a section of such implements to be heated and a heating element located inside such section whereby most of the heat is conducted to the heating section and very little of it is wasted.

In heretofore known electrically heated implements the heating element usually consists of insulated wire wound about the outside of a core, sometimes in the shape of a spool or the like, and the heat is transmitted from the element inwardly to the core and from it to the heating section of the implement. Each successive layer of wire must be insulated from the other, with the result that while the first winding or layer heats the core to some degree, the second winding merely assists in heating the first layer. The heat from the third layer is transmitted inwardly through the second and the first layers, and so on, so that the several outside layers are doing a little more than heating the outside of the main container for the core. In this way, about seventy-five per cent. of the heat is wasted, while only twenty-five per cent. is actually used. Some attempts have been made to remedy this by the use of zigzag heating wires arranged flatly in contact with the heating section, but the degree to which such elements can be heated is limited by the amount of wire used, so that such devices are not successful for instruments where high temperatures are needed, because enough wire cannot be employed.

My invention has for its objects the production of electrically heated implements overcoming the inherent disadvantages of known ones; to produce such implements of improved construction; to reduce the cost of manufacture and the cost incidental to use; and the production of electrically heated implements having heating units which may present resistance to any desired degree.

Other objects of the invention will hereinafter appear.

I accomplish these objects by primarily arranging the heating sections of the implements for containing a special form of heating device. If carbon, or a composition of carbon, or graphite, or a composition of graphite, can be maintained out of contact with the air, it makes a very successful heating element, and such elements can be manufactured in innumerable shapes and of any size and for any resistance, regardless of the shape or size. Such uninsulated units are now to be found upon the market.

In a specific embodiment of my invention, I provide a hollow shell-like heating section having considerable radiating surface for an implement, such, for instance, as a soldering iron. Into the section there is placed the heating unit or resistance element, preferably of the same shape as the cored-out portion of the section, so that it may contact with the walls thereof, suitable electric insulation, such as mica or the like, being provided. This unit is coated with an air-tight, preferably vitreous material, and is provided with suitable terminals for connection to wires having an outside source of electricity. By arranging the heating section of the implement in such manner that it wholly contains the heating unit, at least seventy-five per cent. of the heat is utilized. In the soldering iron, the heat, therefore, is conducted from the unit outwardly to the containing section and thence to the tip or point of application. This would not be possible if the unit were of coiled wire or similar shape because such unit would then be so small that the desired resistance could not be obtained. Such wire would have to be wrapped around the outside of a spool and the heat would be conducted from a small shank to the tip, as is well known.

If the invention is embodied in a soldering iron, the heating section may be relatively small as compared with the body of the iron and may be located directly at the tip. It may have an integral part in the form of a screw, to which the tip itself is attached, and it may be insulated from the handle by any suitable means.

The means I employ in the embodiment of the invention hereinafter described are particularly advantageous, as they combine electrical and heat insulation in a novel and advantageous manner. I employ asbestos cup-shaped disks located in the casing with their peripheral edges contacting, so that there is formed not only a solid block of heat insulation and electrical insulation material around the inner walls of the casing between the heating section and the handle, but also air insulation because of the space confined by means of the inverted dished disks.

If the invention is embodied in a branding iron, for instance, the heating section is the surface. It is cored, if it is cast, or otherwise constructed so that the heating unit in any form may be directly placed therein and made to contact with the walls through suitable electric insulation. The openings should all be suitably sealed by means of any known air-tight material.

In the accompanying drawings showing forms of a specific embodiment of my invention and in the several views of which similar reference numerals designate corresponding parts, Figure 1 is a longitudinal section through a soldering iron embodying the invention, parts being shown in elevation; Fig. 2 is a longitudinal section of the heating unit on an enlarged scale; Fig. 3 is an enlarged horizontal section along line 3—3 of Fig. 1; and Fig. 4 is a transverse section through a branding iron and illustrates diagrammatically the use of the invention in such a tool.

Referring to the drawings, 1 designates a casing for containing the heating unit or heating section. It has the threaded end 2 for the engagement of the handle tube 3, such handle tube being provided with the threaded extremity 4 and the shoulder 5 adapted to abut against the end of the casing. A hollow handle 6 of any desired form in provided with the threaded ferrule 7 for engagement with the threaded end 8 of the tube.

The heating section 9 is preferably of brass or similar metal and comprises a shell having the relatively thick bottom 10 and the screw-threaded extremity 11 for engagement with the soldering tip 12. In use the heat is transmitted through the relatively thick bottom and the threaded extremity to the soldering tip. The heating element, which with this shell constitutes a heating unit, comprises preferably a tubular block of carbon or carbon composition or graphite or graphite composition 13 which is covered with preferably a fused-on vitreous coating of insulating material 14 made, if desired, in accordance with the process disclosed in application of Merrit H. Rice, Serial Number 709,784, filed April 8th, 1913. This coating, however, may be of any desired material and may be applied in any manner, it being essential only that it preserve the material of the element out of contact with the air to prevent disintegration. The heating element is provided with the connections 15 at one end and 16 at the other, which are preferably sealed in position by means of the insulating material. Conducting rod 17 is brazed to the connection 15 and connecting rod 18 is brazed to the connection 16 so that a circuit through the element is possible. These conducting elements are covered with any form of suitable insulation 19, such as mica, electrobestos or the like. In preparation of this heating element, the connections 15 and 16 with their rods are placed in position and the coating 14 is fused on.

The heating element is assembled in the casing of the heating unit and thus transmits its heat through the walls of the latter to the soldering tip. It is placed in the heating section with one end toward the relatively thick bottom 10 of the shell, a piece of mica 20 being provided for insulation purposes. Mica is a conductor of heat but is an insulation against electricity. Asbestos block 21 having holes for the passage of the rods 17 and 18 and disk-shaped asbestos blocks 22 afford suitable insulation against the heat. These are retained in position by means of the threaded washer 23, which may be adjusted in the threaded end of the casing by application of a key-wrench to the keyed hole 24. The asbestos washers 22 are of peculiar construction. They are dished on the contacting sides so that when assembled they not only present a solid block of heat insulation through their contacting peripheries, but also form a confined space for air, which is the best insulation against heat. In order to insulate the heating unit from the walls of the containing casing 1 suitable asbestos or other heat insulating material 25 of any desired shape, such, for instance, as in the shape of cords and sheets, is provided. The connecting rods are provided with suitable terminals 26 for engagement of the ends of wires 27. These wires pass through the handle 6 and are connected to an outside source of electricity.

Fig. 4 illustrates another use of the invention: The heating elements 13' are somewhat similar to that shown in Figs. 1, 2 and 3, but are longer and of less diameter. The branding iron here shown is provided with a heating section 30 and the preferably integral branding surfaces 31. The heating section is cored if cast, or otherwise provided with holes for the reception of the elements 13. Several of the elements are shown in the heating section of the iron and they may be connected in multiple or series through the bus-bars 32 having suitable terminals 33.

The invention is not limited to use in connection with any specific implement except as hereinafter claimed, but embodies the particular heating element and heating section described. I believe myself to be the first to provide practical and efficient heating element contained inside a conducting shell so that the heat is transmitted to the point of application without considerable waste. As stated, this is possible because the heat from the element is confined and is conducted, for instance in a soldering iron, directly from the confining walls of the container to the base which contacts with the tip.

What I claim is:—

1. In an electric heating implement, a hollow heating section, a heating surface in contact with a portion of such section, a solid heating element having an insulating coating and located inside said section, terminals leading from said element, a casing surrounding said section, and a handle attached to said casing.

2. In an electric soldering iron, a hollow heating section, a soldering tip in direct contact with a portion of such section, a solid heating element located inside said section and having an insulating coating, terminals leading from said element, a casing surrounding said section, and a handle attached to said casing.

3. In an electric heating implement, a hollow heating section, a heating surface in contact with a portion of said section, a solid heating element located inside said section and insulated therefrom, terminals leading from said element, heat insulation means surrounding said section, a casing inclosing said section and heat insulating means, whereby heat is confined in said section and directed toward said heating surface, and a handle attached to said casing.

4. In an electric heating implement, a hollow heating section, a portion to be heated in contact with a wall thereof, and a heating implement comprising a tubular block of resistance material located inside said heating section having electric conductors leading therefrom, and a casing surrounding said heating section and having a handle attached thereto.

5. In a soldering iron, a heating unit and a tip attached thereto, a casing surrounding said unit and insulated therefrom, a handle attached to one end of said casing and heat insulation material located between said handle and said unit, said heat insulation material comprising blocks of material having contacting peripheries and spaced away centers to present air insulation between said unit and said handle.

6. In a soldering iron, a casing, a heating unit therein, a tip attached to said unit, conductors leading from said unit to an outside source of electricity, a handle attached to one end of said casing and insulation material located between said unit and said handle, and means in said casing for maintaining said insulation material in contact with said unit and spaced away from said handle.

7. In a soldering iron, a casing having a threaded end for the engagement of a handle, and a heating unit provided with means for engagement of a soldering tip, the handle end of said casing provided with means for locating insulation thereof, and insulation in said casing between said unit and said handle end.

In testimony whereof, I have hereunto set my hand October, 1913, in the presence of subscribing witnesses.

EDWARD C. VAN GLAHN.

Witnesses:
HERMAN GUSTOW,
ALFRED M. HOUGHTON.